Figure 1:
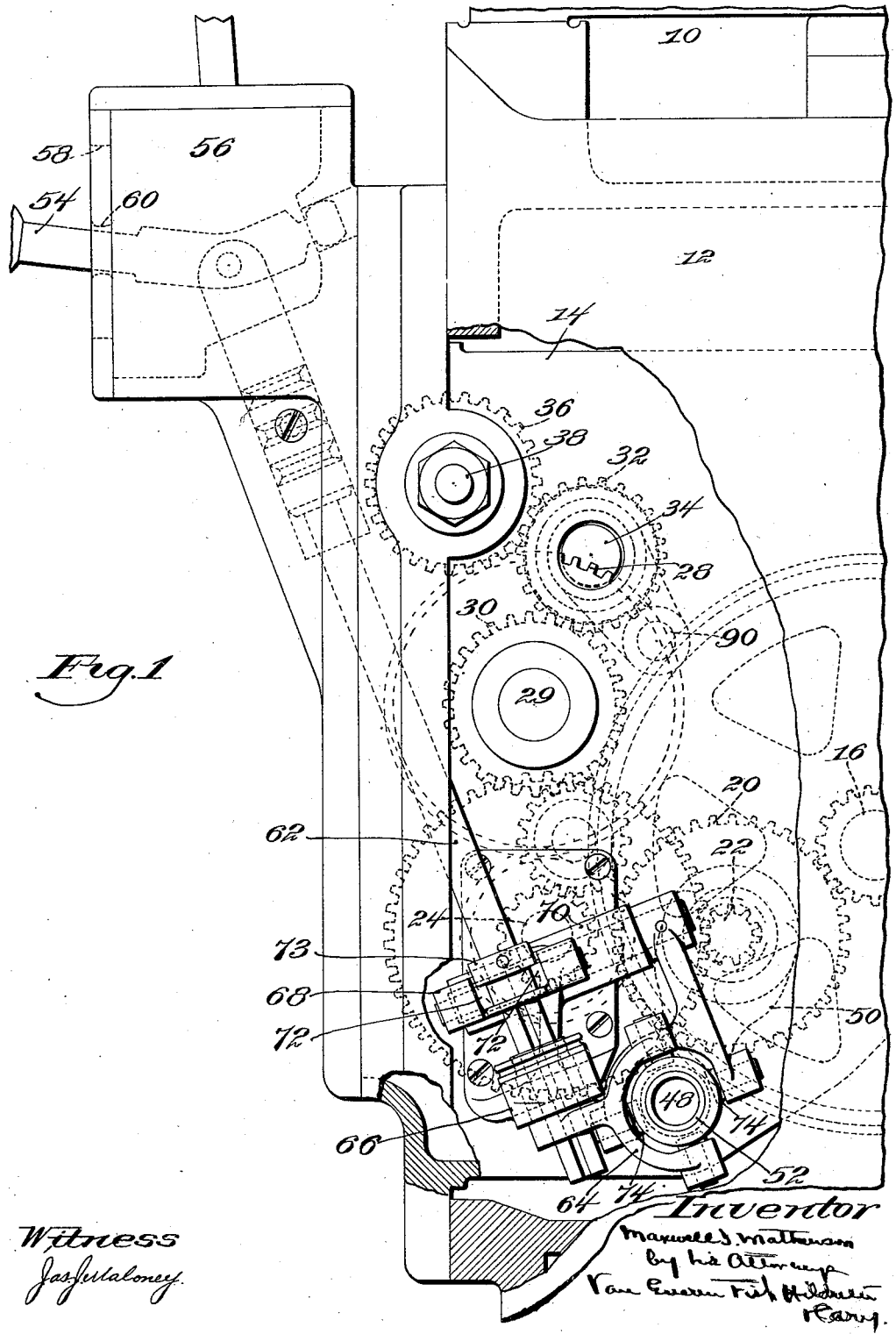

Dec. 17, 1929.  M. I. MATHEWSON  1,739,764
MACHINE TOOL
Filed Jan. 11, 1928   4 Sheets-Sheet 4

Witness
Jas. J. Maloney.

Inventor
Maxwell I. Mathewson
by his attorneys
Van Everen Fish Hildreth & Cary

Patented Dec. 17, 1929

1,739,764

UNITED STATES PATENT OFFICE

MAXWELL I. MATHEWSON, OF PROVIDENCE, RHODE ISLAND, ASSIGNOR TO BROWN AND SHARPE MANUFACTURING COMPANY, A CORPORATION OF RHODE ISLAND

MACHINE TOOL

Application filed January 11, 1928. Serial No. 245,841.

The invention relates to machine tools and more specifically to an improved variable speed table actuating and controlling mechanism particularly adapted for use in grinding machines of ordinary construction employing a rotary grinding wheel movable towards and away from the work and a reciprocating work supporting table movable at a plurality of different speeds back and forth transversely of the grinding wheel.

In grinding machines of the type above referred to, when operating on certain classes of work, it has been found desirable to provide a dwell at the end of the travel of the table in each direction in order to insure an even polish or finish the whole length of the work, and also to provide cushioning devices to cushion the shock due to the application of the driving mechanism when reversed to drive the relatively heavy table at full speed in the opposite direction.

When the table is driven at low speeds, however, the necessity for a dwell at the end of the table travel in each direction disappears since the speed of rotation of the grinding wheel and the work remains relatively constant for the different table speeds and the slower movement of the table causes each section of the work in turn to be given a more thorough finish. At the same time the shock due to reversing the direction of the drive is reduced to an extent which makes the introduction of cushioning devices unnecessary. Under these conditions, the delay at each end of the table travel represents a loss of efficiency of the machine, which is made the more serious by the fact that the mechanism for producing the dwell normally forms a part of the variable speed drive so that at slow speeds the dwell is proportionately increased.

The object of the present invention is to provide a table actuating and controlling mechanism for a grinding machine or other machine tool, which will be free from objectionable loss of efficiency at low table speeds while furnishing the required amount of dwell and cushioning effects at high table speeds.

With this object in view the several features of the invention consist in the devices, combinations and arrangements of parts hereinafter described and claimed and, together with the advantages to be obtained thereby, will be readily understood by one skilled in the art from the following description taken in connection with the accompanying drawings which illustrate the preferred embodiment of the invention in a grinding machine, only so much of the machine being illustrated as is necessary to show the connection of the present invention therewith.

Figure 2:
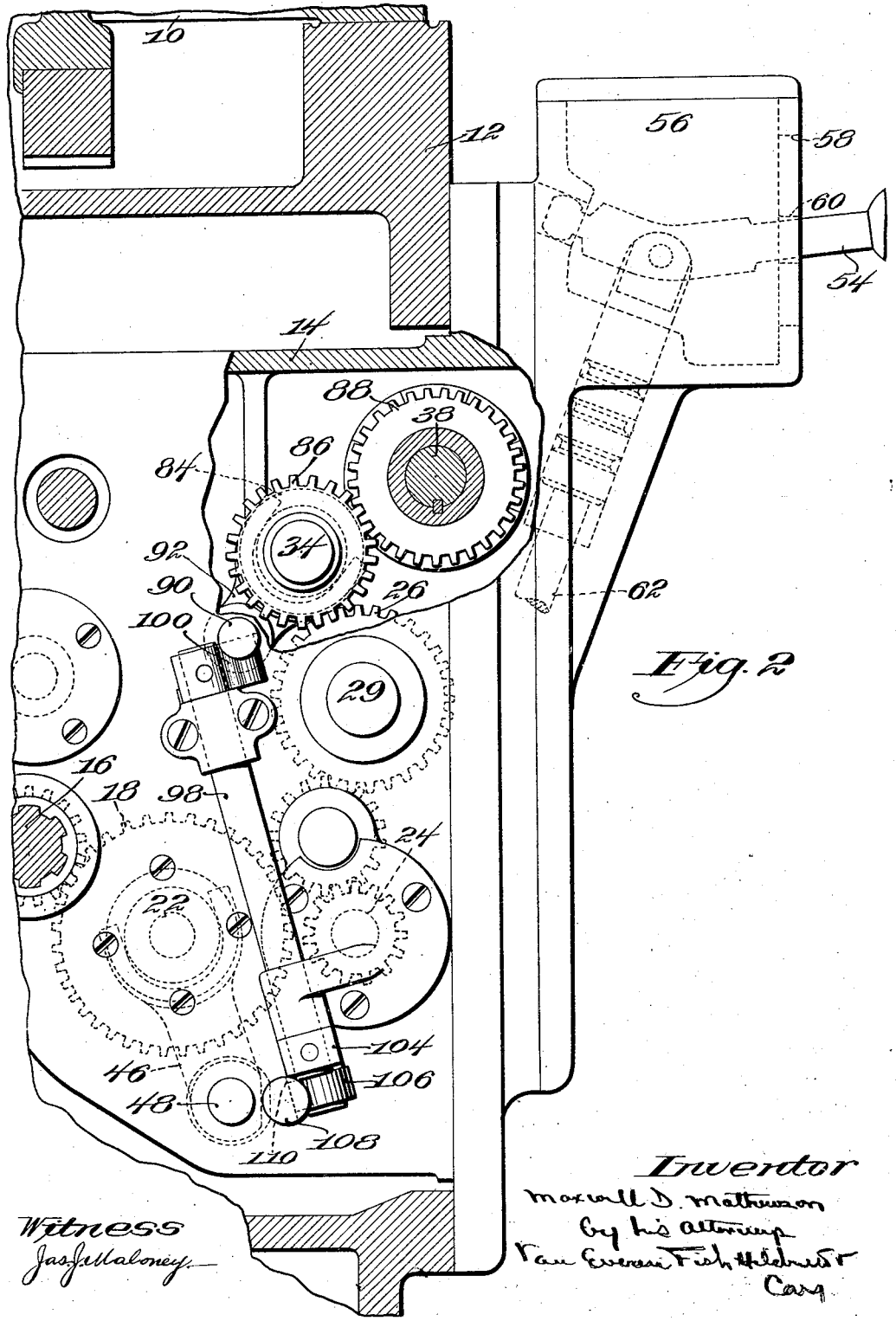
Figure 3:
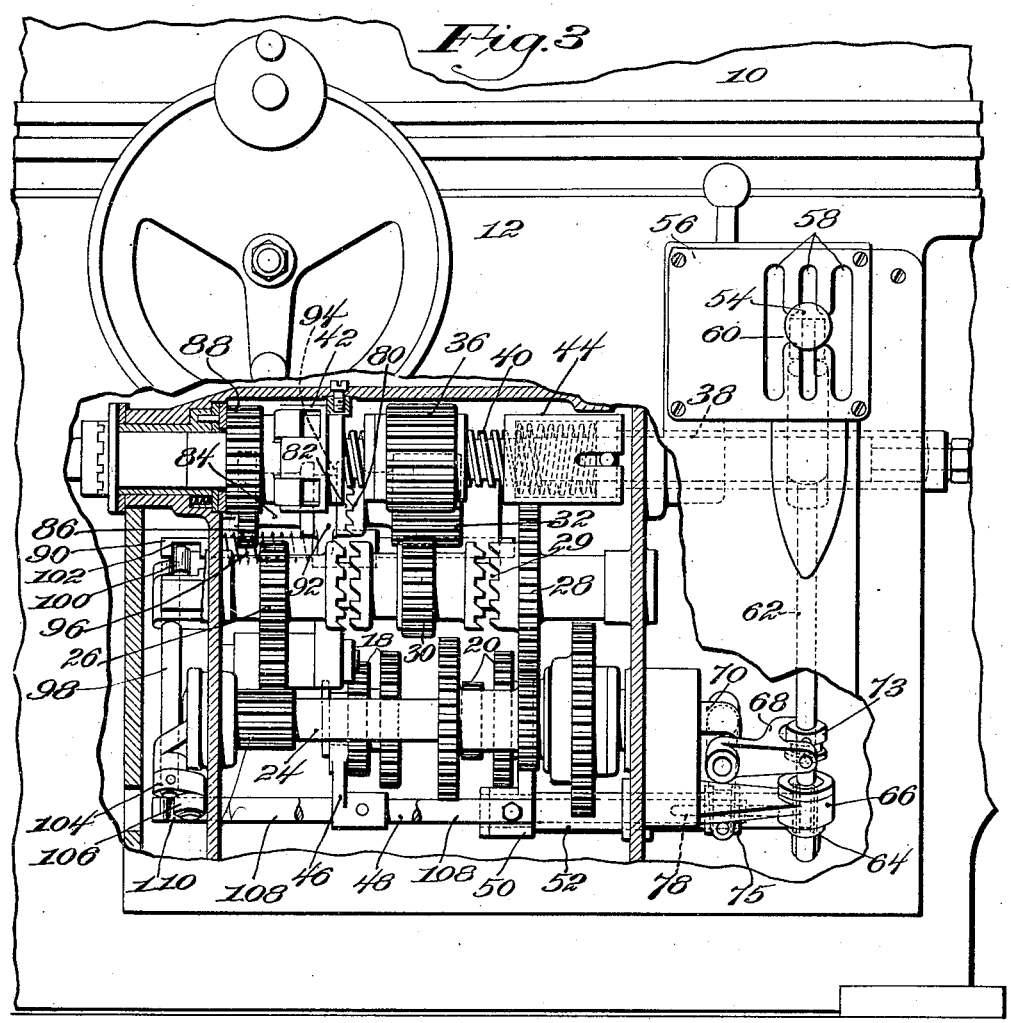
Figure 4:
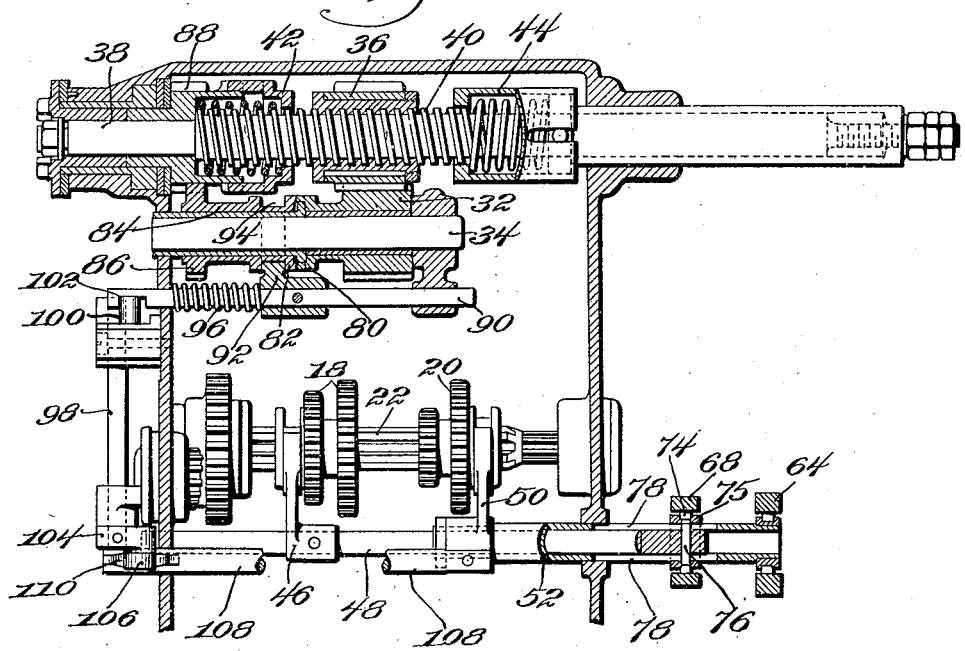
Figure 5:
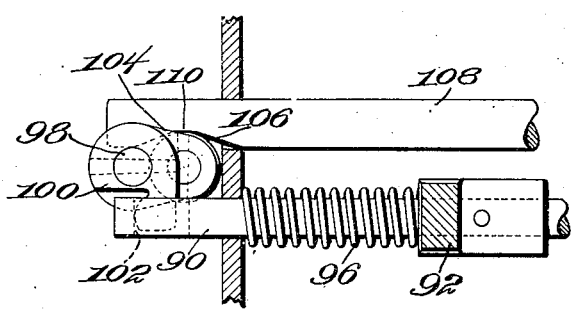

In the drawings, Fig. 1 is a view in right side elevation of the change speed gears and change speed gear shift lever for the table drive; Fig. 2 is a view in left side elevation partly in section of the change speed gears illustrating particularly the mechanism for eliminating the dwell; Fig. 3 is a view in front elevation of the change speed mechanism for driving the table with parts broken away; Fig. 4 is a somewhat diagrammatic view in front elevation partly in section illustrating particularly the mechanism for securing a dwell at the end of the table travel in each direction and for eliminating the dwell at slow table speeds; and Fig. 5 is a detail plan view on an enlarged scale of certain of the parts illustrated in Fig. 4.

The grinding machine to which the illustrated embodiment of the invention has been applied is disclosed in applicant's pending application, Serial No. 206,917, filed July 19, 1927. This machine is provided with a rotary grinding wheel movable towards and away from the work, and with a reciprocating work supporting table driven by a variable speed mechanism adapted to give nine different table speeds. The table is given a dwell at the end of its travel in each direction by means of a gear which is threaded for endwise movement on the driving shaft, and yielding spring stops are provided at each end of the travel of the gear on the driving shaft to cushion the shock of the application of the driving mechanism to drive the table in a reverse direction. Since, as previously pointed out, the dwell and cushioning mechanism are of advantage only at high speeds, and at low speeds result in a serious loss in efficiency, the present improvement contemplates the provision of means for automatically eliminating the dwell at low table speeds. This means, as illustrated, comprises a separate train of gearing for connecting the driving shaft for the table rigidly with the reversing mechanism to secure a positive drive in each direction, and means controlled from the change speed mechanism for rendering this gearing operative.

Referring more specifically to the drawings, the work supporting table is indicated at 10 slidably mounted on ways on the machine frame 12 which also carries the gear box 14 housing the change speed and reversing gears through which the table is driven. The table is driven from the main driving shaft 16 of the machine at any one of nine different speeds through gearing, comprising sliding change-speed gear sets 18 and 20 mounted on a shaft 22 and arranged respectively to move into and out of mesh with gears on the driving shaft 16 and on a transmitting shaft 24. From the transmitting shaft 24, reversing gears 26 and 28, loosely mounted on the shaft 29, are driven in opposite directions. A gear clutch member 30 is loosely mounted on the shaft 29 between the reversing gears 26 and 28 to engage with one or the other of them and meshes with an idler gear 32 mounted on a shaft 34. The gear 32 in turn meshes with a gear 36 which is mounted on the driving shaft 38 of the table power feed.

In order to provide a dwell at the end of the travel of the table in each direction, the gear 36 is internally threaded to engage with a screw thread 40 on the driving shaft 38 so that when the direction of rotation of the gear 36 is reversed, the screw connection 40 will cause the gear 36 to move along the shaft 38 to the end of its travel before it is locked to turn the shaft. Cushioning devices comprising the spring pressed sleeve plungers 42 and 44 surrounding the driving shaft 38 are provided to take up the shock of starting the table when the gear 36 reaches the end of its travel on the screw 40 and is locked to turn with the driving shaft 38. This mechanism is more fully described in applicant's application above referred to.

The mechanism for shifting the gear sets 18 and 20 comprises a yoke 46 which is mounted on a shaft 48 movable in a lengthwise direction to three different positions to secure three different speeds of the shaft 22 and a yoke 50 which is secured to a sleeve 52 surrounding the shaft 48 and is movable independently of the shaft to three different positions to secure three speeds of the speed transmitting shaft 24 for each speed of the shaft 22.

The change speed gears may be readily set by the operator to secure the desired speed by means of a change speed control lever 54 which is mounted in a box or casing 56 on the machine frame and is guided in a series of slots comprising three parallel vertical slots 58 and a centrally located horizontal connecting slot 60. The lever is adapted to move vertically to assume a high or low or intermediate position in each of the three slots corresponding to any one of three closely related speeds and is adapted for horizontal movement from one slot to another to shift from one group of speeds to the other to operate the table at relatively high, low or medium speed.

The connections for operating the clutch shaft 48 and the clutch sleeve 52 from the change speed control lever 54 comprise a substantially vertical shaft 62 connected at its upper end to the change speed lever 54, and adapted to move lengthwise with the vertical movement of the lever and to rotate with the horizontal movement of the lever in the connecting slot 60. The rotary movements of the shaft 62 are adapted to impart a lengthwise movement to the sleeve 52 carrying the clutch shifting yoke 50 through connections which include a lever arm 64 which is keyed to rotate with the shaft 62 and is provided at its free end with a yoke adapted to engage with the yoke carrying sleeve 52. The hub of the lever 64 is journaled within a bracket 66 so that the lever is secured against lengthwise movement with the shaft 62. The lengthwise movements of the shaft 62 are utilized to impart a lengthwise movement to the yoke carrying shaft 48 by means of connections comprising a bell crank lever 68 which is mounted in a bracket 70 and at one end is provided with a yoke carrying rolls 72 engaging a grooved collar 73 secured to the shaft 62. At its other end the bell crank lever 68 is provided with a yoke which carries rolls 74 engaging a grooved collar 75 which is in turn secured to the clutch shaft 48 by means of a pin 76 which extends through slots 78 in the clutch sleeve 52 to permit free movement of the collar 75 and clutch shaft 48 with relation to the sleeve 52.

The mechanism for causing the table to be driven without dwell at low table speeds which forms more particularly the subject-matter of the present invention operates automatically, when the change speed gears are set for low speed operation, to cause the table driving shaft 38 to be connected positively with the reversing gears so that the table is abruptly stopped and started in the opposite direction without pause or yield in the mechanism. As herein disclosed, this mechanism for eliminating the dwell is adapted to be thrown into operation when the change speed mechanism is set to operate at any one of the three speeds which comprise the slow speed group. It may be pointed out, however, at this point, that while the construction herein disclosed incorporates new and desirable features, the invention in its broader aspects is not to be limited to any specific construction or arrangement but is broadly applicable to any variable speed mechanism of this general description employing a dwell which is eliminated at one or more slow speeds to secure the more efficient operation of the machine.

The mechanism for causing the table to be driven without dwell at low table speeds comprises a train of gearing for connecting the change speed and reverse gears to drive the shaft 38 and the table 10 independently of the gear 36 and the screw thread 40. The idle gear 32 has formed at one end a clutch member 80 which is adapted to engage with a corresponding clutch member 82 formed on a sleeve 84 loosely mounted to slide on the shaft 34. The sleeve 84 also carries a gear 86 which is held at all times in mesh with a gear 88 formed on the driving shaft 38. When the clutch members 80 and 82 are in mesh the driving shaft 38 is directly connected to rotate with the idle gear 32 while the gear 36 remaining in mesh with the gear 32 and being driven at the same speed as the shaft 38 is prevented from turning with relation to the screw 40 at the end of the table travel in each direction.

The clutch members 80 and 82 are thrown into mesh to eliminate the dwell at low table speeds by means of mechanism which is controlled automatically from the change speed mechanism and comprises the control bar 90 which carries a yoke 92 adapted to engage with a peripheral groove 94 in the sleeve 84. A compression spring 96 coiled about the control bar 90 between the yoke 92 and a fixed portion of the machine frame tends to move the sleeve 84 to the right as shown in Fig. 4 to hold the clutch members 80 and 82 in contact.

A simple, convenient and efficient means of operating the control bar 90 from the change speed mechanism is afforded by operating the bar through intervening connections from the clutch sleeve 52 for shifting the gears to the low, medium or high speed groups. These connections comprise a vertically situated rock shaft 98 which is provided at its upper end with a cam arm 100 offset from the shaft and adapted to engage in a transverse groove 102 cut in the under side of the bar 90. At its lower end the rock shaft 98 carries a short lever arm 104 provided with a cam roll 106 which is held yieldingly in contact with a cam slide bar 108 by the pressure of the spring 96 which acts through the control bar 90 and cam arm 100 to rock the shaft 98. The slide bar 108 is rigidly secured to move with the clutch sleeve 52 so that the position of the slide bar 108 is determined in accordance with the setting of the variable speed gears to secure table speeds within the high, low, or medium speed groups. A recess 110 is formed in the slide bar 108 which is adapted in the low speed position of the sleeve 52 to permit the rock shaft 98 and the lever arm 104 carrying the cam roll 106 to rotate under the influence of the compression spring 96 so that the control bar 90 and the clutch sleeve 84 are moved to the right engaging the clutch members 80 and 82. When the change speed control lever 54 is again shifted by the operator in a horizontal direction to position the sleeve 52 to secure table speeds within the medium or high speed groups, the corresponding movement of the slide bar 108 causes the cam roll 106 to ride out of the recess 110 and by rotating the rock shaft 98 in an opposite direction causes the control bar 90 and clutch sleeve 84 to be moved to the left as viewed in Fig. 4, disengaging the clutch members 80 and 82. When this occurs, since the table driving shaft 38 is no longer directly connected to the idler gear 32, the table is driven through the connection of this gear with the gear 36 and the screw 40 with a dwell at the end of the table travel in each direction.

The nature and scope of the invention having been indicated and the specific embodiment of the invention having been described, what is claimed is:—

1. A machine tool having, in combination, a work supporting table, change speed mechanism, a reversing mechanism for imparting a reciprocatory movement to the table from the change speed mechanism, means for providing a dwell at each end of the reciprocatory movement of the table, and mechanism acting when rendered operative to drive the table from the reversing mechanism without dwell.

2. A machine tool having, in combination, a work supporting table, change speed mechanism, a reversing mechanism for imparting a reciprocatory movement to the table from the change speed mechanism, mechanism for imparting a dwell in the movement of the table at each end of its reciprocating movement, and means controlled from the change speed mechanism for eliminating the dwell.

3. A machine tool having, in combination, a work supporting table, driving mechanism comprising change speed mechanism, a reversing mechanism for imparting a reciprocatory movement to the table from the change speed mechanism, means for cushioning the movement of the table drive to move the table in an opposite direction, and mechanism acting when rendered operative to secure a positive reversing movement of the table.

4. A machine tool having, in combination, a work supporting table, change speed mechanism, a reversing mechanism for imparting a reciprocatory movement to the table from the change speed mechanism, means for providing a dwell at each end of the reciprocatory movement of the table, means for adjusting the amount of the dwell, and alternative mechanism for driving the table from the reversing mechanism without dwell.

5. A machine tool having, in combination, a longitudinally movable table for supporting the work, driving mechanism for the table comprising a change speed mechanism for securing a plurality of driving speeds, a reversing mechanism for imparting a reciprocatory movement to the table from the change speed mechanism, means for providing a dwell at each end of the reciprocatory movement, mechanism for eliminating the dwell, and clutch mechanism controlled from the change speed mechanism for rendering active the mechanism for eliminating the dwell.

6. A machine tool having, in combination, a longitudinally movable table for supporting the work, driving mechanism for the table comprising a change speed mechanism for securing a plurality of driving speeds, a reversing mechanism for imparting a reciprocatory movement to the table from the change speed mechanism, means for providing a dwell at each end of the reciprocatory movement of the table, and means controlled from the change speed mechanism for eliminating the dwell at slow table speeds.

7. A machine tool having, in combination, a longitudinally movable table for supporting the work, driving mechanism for the table comprising a change speed mechanism for securing a plurality of driving speeds, a change speed control member, a reversing mechanism for imparting a reciprocatory movement to the table from the change speed mechanism, means for providing a dwell at each end of the reciprocatory movement of the table, mechanism for driving the table from the reversing mechanism without dwell, and mechanism controlled by the change speed control member to throw the mechanism for driving the table without dwell into operation.

8. A machine tool having, in combination, a movable table for supporting the work, driving mechanism for the table comprising a change speed mechanism to secure a plurality of table speeds, a reversing mechanism for imparting a reciprocatory movement to the table from the change speed mechanism, a shaft from which the table is driven, a gear member driven from the reversing mechanism threaded for limited travel on the shaft to secure a dwell at each end of the reciprocatory movement of the table, and a clutch mechanism for connecting the reversing mechanism to the shaft independently of the gear to drive the table without dwell.

9. A machine tool having, in combination, a movable table for supporting the work, driving mechanism for the table comprising a change speed mechanism for securing a plurality of table speeds, a reversing mechanism for imparting a reciprocatory movement to the table from the change speed mechanism, a shaft from which the table is driven, a gear member driven from the reversing mechanism threaded for a limited travel on the shaft to secure a dwell at each end of the reciprocatory movement of the table, clutch mechanism for connecting the reversing mechanism to the shaft independently of the gear to drive the table without dwell, and means actuated by the change speed mechanism to operate the clutch mechanism to eliminate the dwell at low table speed.

10. A machine tool having, in combination, a movable table for supporting the work, driving mechanism for the table comprising a change speed mechanism to secure a plurality of table speeds, a reversing mechanism for imparting a reciprocatory movement to the table from the change speed mechanism, a shaft from which the table is driven, a gear member driven from the reversing mechanism threaded for a limited travel on the shaft to secure a dwell at each end of the reciprocatory movement of the table, and means controlled by the change speed mechanism to connect the reversing mechanism to the shaft independently of the gear to drive the table without dwell.

11. A machine tool having, in combination, a movable table for supporting the work, a driving mechanism for the table comprising a nine-speed gear shift mechanism, a reversing mechanism for imparting a reciprocatory movement to the table from the change speed mechanism, a shaft from which the table is driven, a gear member driven from the reversing mechanism threaded for a limited travel on the shaft to secure a dwell at each end of the reciprocatory movement of the table, clutch mechanism for connecting the reversing mechanism to the shaft independently of the gear to drive the table without dwell, and means actuated by the gear shift mechanism to operate the clutch mechanism to eliminate the dwell at the three lowest table speeds.

12. A machine tool having, in combination, a movable table for supporting the work, driving mechanism for the table comprising a change speed mechanism adapted to secure a plurality of table speeds, a reversing mechanism for imparting a reciprocatory movement to the table from the change speed mechanism, means for cushioning the movement of the table drive to move the table in an opposite direction, alternative mechanism for providing a positive reverse for the table, and mechanism actuated from the change speed mechanism for rendering active the alternative mechanism to secure a positive table reverse at low table speeds.

13. A machine tool having, in combination, a work supporting table, driving mechanism comprising change speed mechanism, a reversing mechanism for imparting a reciprocatory movement to the table from the change speed mechanism, means for cushioning the movement of the table drive to move the table in an opposite direction, and means controlled from the change speed mechanism to secure a positive reversing movement of the table.

14. A machine tool having, in combination, a movable table for supporting the work, a driving mechanism for the table comprising a change speed mechanism to secure a plurality of table speeds, a reversing mechanism for imparting a reciprocatory movement to the table from the change speed mechanism, an idler gear driven from the reversing mechanism, a shaft from which the table is driven, a gear member driven from the idler gear threaded for a limited travel on the shaft to secure a dwell at each end of the reciprocatory movement of the table, and separate connections from the idler gear for driving the shaft without dwell.

15. A machine tool having, in combination, a movable table for supporting the work, a driving mechanism for the table comprising a change speed mechanism to secure a plurality of table speeds, a reversing mechanism for imparting a reciprocatory movement to the table from the change speed mechanism, an idler gear driven from the reversing mechanism, a shaft from which the table is driven, a gear member driven from the idler gear threaded for a limited travel on the shaft to secure a dwell at each end of the reciprocatory movement of the table, and connections from the idler gear for driving the shaft independently of the gear member without dwell.

16. A machine tool having, in combination, a movable table for supporting the work, a driving mechanism for the table comprising a change speed mechanism to secure a plurality of table speeds, a reversing mechanism for imparting a reciprocatory movement to the table from the change speed mechanism, an idler gear driven from the reversing mechanism, a shaft from which the table is driven, a gear member driven from the idler gear threaded for a limited travel on the shaft to secure a dwell at each end of the reciprocatory movement of the table, a gear fixed to the shaft, a clutch connection between the idler gear and the fixed gear on the shaft, and means for operating the clutch to drive the shaft independently of the gear member without dwell.

17. A machine tool having, in combination, a movable table for supporting the work, change speed mechanism for securing a plurality of table speeds, a reversing mechanism for imparting a reciprocatory movement to the table from the change speed mechanism, means for providing a dwell at each end of the reciprocatory movement of the table, means for driving the table from the reversing mechanism without dwell, a change speed control lever movable in one direction to select one of three groups of low, medium, or high table speeds and movable in another direction to select the desired table speed within the group, and means actuated by the movement of the lever to select the desired group to render operative the mechanism for driving the table from the reversing mechanism without dwell.

18. A machine tool having, in combination, a longitudinally movable table for supporting the work, driving mechanism for the table comprising a change speed mechanism for securing a plurality of table speeds, a reversing mechanism for imparting a reciprocatory movement to the table from the change speed mechanism, a shaft from which the table is driven, a gear member driven from the reversing mechanism threaded for a limited travel on the shaft to secure a dwell at each end of the reciprocatory movement of the table, a clutch mechanism for connecting the gear rigidly with the shaft to drive the table without dwell, a change speed control lever movable in one direction to select one of three groups of low, medium, or high table speeds and movable in another direction to select the desired table speed within the group, and means actuated by the movements of the lever to select the desired group to render operative the clutch mechanism for driving the table without dwell.

19. A machine tool having, in combination, a movable table for supporting the work, a driving mechanism for the table comprising a change speed mechanism to secure a plurality of table speeds, a reversing mechanism for imparting a reciprocatory movement to the table from the change speed mechanism, a shaft from which the table is driven, a gear member driven from the reversing mechanism threaded for a limited travel on the shaft to secure a dwell at each end of the reciprocatory movement of the table, clutch mechanism for connecting the gear to the shaft to drive the table without dwell, means comprising a clutch sleeve for operating the change speed mechanism to secure a relatively low, medium, or high table speed, and mechanism adapted for the low speed position of the said means to operate the clutch mechanism to drive the table without dwell.

In testimony whereof I have signed my name to this specification.

MAXWELL I. MATHEWSON.